Patented June 11, 1929.

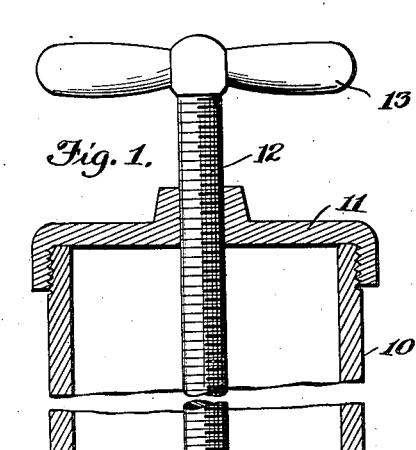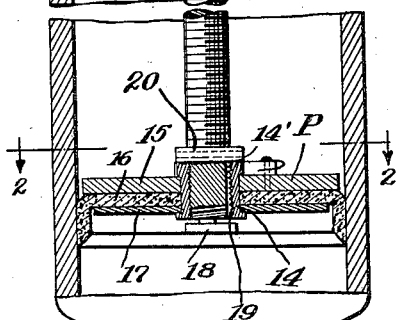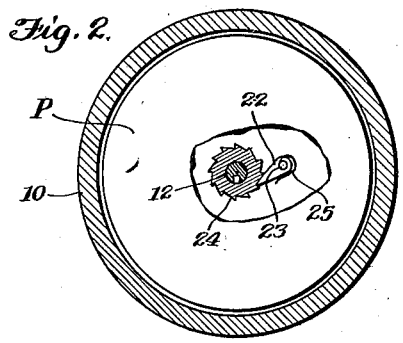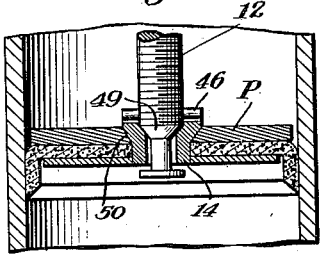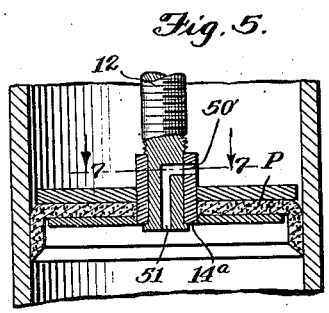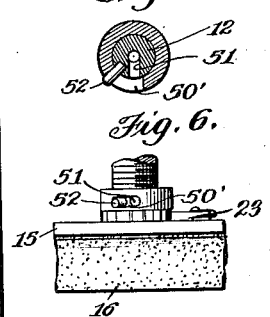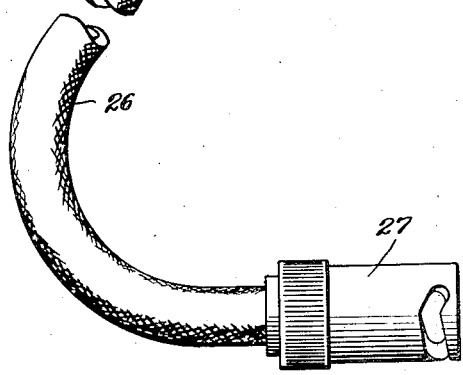

1,716,504

UNITED STATES PATENT OFFICE.

EARL F. PIERCE, OF WINNETKA, ILLINOIS, ASSIGNOR TO ALEMITE MANUFACTURING CORPORATION, OF CHICAGO, ILLINOIS, A CORPORATION OF DELAWARE.

LUBRICANT COMPRESSOR.

Application filed October 17, 1925. Serial No. 63,082.

My invention relates to improvements in lubricant compressors, and is particularly concerned with improvements in that type of compressor used for supplying lubricant under high prsessure to the bearings that are to be lubricated. The compressor embodying my invention is particularly adapted to be used in connection with fittings, one of which is secured to each of the bearings to be lubricated, the compressor and fittings comprising means for establishing sealed connections between the compressor and the fittings.

The objects of my invention are:

First, to provide a lubricant compressor which is simple in construction, economical to manufacture and easy to operate;

Second, to provide a lubricant compressor comprising a coupling member for making connection with the fittings, the coupling member including a sealing member which is held in sealed contact with the fitting by the pressure of the lubricant, the compressor comprising means whereby the pressure upon the lubricant can easily and quickly be relieved so as to enable the coupling member to be detached from a fitting; and Third, to provide a compressor, such as described, in which the means for relieving the pressure on the lubricant is actuated, or operable, by the same means which is employed for placing pressure upon the lubricant.

Other objects of my invention will appear as this description progresses, reference being had to the accompanying drawings, in which Figure 1 is a central, longitudinal section, partially in side elevation, through a compressor embodying my invention, this view showing also my improved coupling member in central longitudinal section;

Figure 2 is a transverse section taken on line 2—2 of Figure 1;

Figure 3 is a longitudinal, sectional detail, similar to that part of Figure 1 which illustrates the pressure relieving means of my improved compressor, but showing a modified form thereof;

Figure 4 is a fragmentary side elevation of a portion of the construction shown in Figure 3;

Figure 5 is a view, similar to Figure 3, but showing a further modification of my invention;

Figure 6 is a fragmentary side elevation of a part of the construction shown in Figure 5; and Figure 7 is a transverse section taken on line 7—7 of Figure 5.

Throughout the several views, similar reference characters will be used for referring to similar parts.

Lubricating systems comprising a plurality of fittings, one of which is secured to each of the bearings to be lubricated, and a compressor comprising means for placing the lubricant under high pressure, and other means for making sealed connections with the various fittings, are well known. In most of these systems the compressor includes a coupling member having a sealing element or device for making sealed contact with the fittings. This sealing element, or device, is usually in the form of a gasket or cup leather, which is subjected to the pressure of the lubricant, and the pressure of the lubricant against this sealing element, or device, is frequently used for locking the coupling member to the fittings. This makes it necessary to relieve the pressure upon the lubricant to enable the operator to remove the coupling member from the fitting. Furthermore, many of the coupling members employed are not provided with valves, so that it is necessary to relieve the pressure upon the lubricant before the coupling member is detached from the fitting to prevent the lubricant from escaping from the coupling member when it has been detached.

My present invention contemplates the provision of novel means for relieving the pressure upon the lubricant in the compressor, so as to expedite the removal of the coupling member from the fitting, and also to prevent the escape of lubricant from the coupling member when it has been detached from the fitting.

That embodiment of my invention illustrated in Figures 1 and 2 comprises the compressor barrel 10 having the removable end closure 11, through which is threaded the threaded piston rod 12, having the handle 13 at its outer end, whereby the piston rod may be rotated.

A sleeve 14 surrounds the inner end of the piston rod 12 and is internally threaded for receiving the inner end of the piston rod 12. A piston P is carried by the sleeve 14. This piston comprises the back plate 15, the cup leather 16, and the face plate 17, all of which are centrally apertured and mounted upon the sleeve 14, being confined between the flange 14' of the sleeve and the head of the screw 18, which is screwed into the inner end of the piston rod 12. The longitudinally extending groove 19 is cut in the piston rod 12 adjacent its inner end, but terminates at a point inside the end of the sleeve 14 adjacent the cap 11, so that when the parts are in the position shown in Figure 1, the groove will not establish communication between the chambers on opposite sides of the piston P. A collar 20, surrounding the piston rod 12 and secured thereto by means of a pin 21, provides means for limiting the inward movement of the piston rod 12 relatively to the piston P.

A pawl 22 is pivotally secured to the follower plate 15 by means of a pivot pin 23, and its free end is yieldingly held in engagement with the ratchet teeth 24, formed on the outer end of the sleeve 14, by means of the spring 25.

From the above description it will be apparent that when the handle 13 is turned in the proper direction, it will cause the piston rod 12 to be moved inwardly into the barrel 10, and that the sleeve 14 will rotate in the follower plate 15, the cup leather 16 and the face plate 17, thereby permitting the piston P to be actuated to place the lubricant in the barrel 10 under pressure. When it is desired to relieve the pressure on the lubricant, the operator merely reverses the direction of rotation of the handle 13. At this time, the piston P is held stationary, with respect to the barrel 10, by the frictional engagement between the flange of the cup leather 16 and the walls of the barrel 10. Upon rotating the handle 13 in the direction just referred to, the pawl 22 will prevent rotation of the sleeve 14, and the piston rod 12 will move outwardly while the piston P will stand still. This causes the piston rod 12 to be unscrewed from the sleeve 14 until the groove 19 establishes communication between the front and rear sides of the piston P. The pressure upon the lubricant at the front side of the piston P will, thereupon, be relieved by the escape of lubricant, or any air which may be contained in the lubricant, through the groove 19 to the rear side of the piston P. It will require the passage of but very little lubricant through this groove completely to relieve the pressure on the lubricant in front of the piston, and if there is any air confined in the lubricant, practically all of it will escape the first time the groove 19 is opened. Thereafter, only small quantities of lubricant will be discharged to the rear of the piston when the pressure upon the lubricant is relieved, as described above.

When the compressor has been in use for some time, a small quantity of lubricant may escape to the rear of the piston P, but practically all of this lubricant can be displaced to the front side of the piston P by retracting the piston to the end of the barrel, closed by the cap 11, whereupon the lubricant at the rear side of the piston P will be squeezed past the flange of the cup leather 16 to the front side of the piston.

The flexible discharge conduit 26 terminates in a coupling member 27 of any suitable or preferred construction.

The construction illustrated in Figures 3 and 4 is similar to that shown in Figures 1 and 2, except that the screw-threaded connection between the piston rod 12 and the sleeve 14 is replaced by the connection established by the pin 46, which extends through the piston rod 12 and the cam surface 47, formed in the outer edge or end of the sleeve 14. This cam surface terminates in a stop or shoulder 48, which limits the movement of the pin 46, relatively to the sleeve 14, in one direction. A pivoted pawl 22, similar to that shown in Figure 2, engages with the ratchet teeth 24, formed on the outer end of the sleeve 14, to prevent rotation of the sleeve 14 in the opposite direction, so that when the piston rod 12 is rotated in the direction opposite from that in which it is rotated to place the lubricant under pressure, the pin 46 will ride outwardly on the cam surface 47 and separate the valve 49 from the seat 50 formed in the sleeve 14, and thereby permit the pressure on the lubricant to be expended through the connection thus established between the front and rear sides of the piston.

The construction shown in Figure 5 is similar to that just described, except that here the valve port or seat 50' opens laterally through the wall of the sleeve 14$^a$, and is adapted to be brought into registry with the passageway 51, formed in the inner end of the piston rod 12, when the latter is rotated in a direction opposite to that in which it is rotated to place the lubricant under pressure. The valve port 50' is elongated circumferentially, as shown in Figure 6, and a pin 52, extending outwardly from the piston rod 12, is adapted to slide therein and to engage one end of the valve port 50' when the piston rod 12 is turned in the direction to place the lubricant in the compressor under pressure. At this time, the outer end of the passageway 51 will be closed by the wall of the sleeve 14$^a$. When, however, the piston rod 12 is turned in the opposite direction, the pawl 22 will engage the ratchet teeth 24 on the sleeve 14$^a$, and hold the latter stationary until the piston rod 12 moves into position to bring the port 50' and the passageway 51 into registry. Thereupon, the pressure upon the opposite sides of the piston P will be substantially equalized, as described above.

In all these embodiments the movement opening the vent is limited by stop means establishing a connection for rotating the piston with the piston rod. This is not a rigid stop, such that the connecting means might be broken by undue force, but presents such a marked and sudden increase in the resistance to movement as to perform all the necessary functions of a stop, without the risk of breakage attendant on a positive stop action.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. Lubricating means comprising a compressor having a chamber, means for contracting said chamber to decrease its volume and compress and eject its contents, said contracting means including drive means, and means operative when the contents of said chamber are under high pressure for venting said chamber upon a slight retrograde movement of said drive means without retrograde movement of the rest of said contracting means to relieve the compression of the contents, said venting means comprising a lost motion connection between said drive means and the rest of said contracting means, and a passageway formed in said drive and contracting means and opened and closed by the lost motion.

2. Lubricating means comprising a compressor having a barrel, a piston in said barrel, a threaded piston rod, a transmission member swiveled on said piston, means permitting rotation of said transmission member in one direction only with respect to said piston, valve means formed integrally in said rod and member, and a lost motion connection between said piston rod and transmission member permitting opening and closing of said valve means.

3. Lubricating means comprising a compressor having a barrel, a piston in said barrel, a threaded piston rod, a transmission member swiveled on said piston, means permitting rotation of said transmission member in one direction only with respect to said piston, relief valve means, and a lost motion connection between said piston rod and transmission member for permitting operation of said valve means.

4. Lubricating means comprising a compressor having a barrel, a piston in said barrel, drive means for said piston, and valve means closed by movement of said drive means in a direction to compress lubricant and opened by a retrograde movement irrespective of the pressure of the contents of said barrel upon said piston.

5. Lubricating means comprising a barrel, a piston movable therein to compress lubricant, and means operative when the lubricant in said barrel is under high pressure for relieving the lubricant pressure by venting past the piston, said piston permitting lubricant thus vented to pass by it on the return stroke.

6. Lubricating means comprising a compressor having a barrel, a piston in said barrel and means for operating said piston to compress and eject lubricant from said barrel, said operating means including drive means, and means operative when the contents of said barrel is under high pressure for venting said contents into that part of the barrel in rear of said piston upon a slight retrograde movement of said drive means without retrograde movement of said piston, whereby the compression of the contents may be relieved.

7. Lubricatig means comprising a compressor having a barrel, a piston in said barrel, a piston rod, a transmission member in said piston, a lost motion connection between said piston rod and transmission member, and valve means operative when the contents of said barrel are under high pressure, said valve means opened and closed by taking up the lost motion in opposite directions.

In witness whereof, I hereunto subscribe my name this 9th day of October, 1925.

EARL F. PIERCE.